US008019880B2

(12) United States Patent
Xiong et al.

(10) Patent No.: US 8,019,880 B2
(45) Date of Patent: Sep. 13, 2011

(54) METHOD FOR DISTRIBUTING SERVICE ACCORDING TO TERMINAL TYPE

(75) Inventors: Wei Xiong, Shenzhen (CN); Xiaming Lai, Shenzhen (CN); Jiahong Wei, Shenzhen (CN); Yuanxiang Chen, Shenzhen (CN); Chenglong Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 702 days.

(21) Appl. No.: 11/629,956

(22) PCT Filed: Apr. 28, 2006

(86) PCT No.: PCT/CN2006/000832
§ 371 (c)(1),
(2), (4) Date: Dec. 18, 2006

(87) PCT Pub. No.: WO2006/116925
PCT Pub. Date: Nov. 9, 2006

(65) Prior Publication Data
US 2007/0266163 A1    Nov. 15, 2007

(30) Foreign Application Priority Data

Apr. 29, 2005    (CN) .......................... 2005 1 0067881

(51) Int. Cl.
*G06F 15/16*    (2006.01)
(52) U.S. Cl. ...................................................... 709/229
(58) Field of Classification Search .................... 709/229
See application file for complete search history.

(56) References Cited

U.S. PATENT DOCUMENTS

| 6,009,103 A | 12/1999 | Woundy | 370/401 |
| 6,697,851 B1 * | 2/2004 | Althaus et al. | 709/220 |

(Continued)

FOREIGN PATENT DOCUMENTS

| CN | 1425979 A | 6/2003 |
| CN | 1516846 A | 7/2004 |
| CN | 1543127 A | 11/2004 |
| CN | 100407625 C | 7/2008 |
| EP | 1 333 647 A2 | 11/2002 |
| JP | 2004128753 A | 4/2004 |

OTHER PUBLICATIONS

Hibbs, R., et al. "Interpreting Client Options for the Dynamic Host Configuration Protocol," pp. 18-19 (Oct. 1999).
Rfc2131, Droms, R., "rfc2131", "Dynamic Host Configuration Protocol", Mar. 1997, Bucknell University.
Droms, R., "rfc2131", "Dynamic Host Configuration Protocol", Mar. 1997, Bucknell University.

*Primary Examiner* — Kenny Lin
*Assistant Examiner* — Farhad Ali
(74) *Attorney, Agent, or Firm* — Slater & Matsil, L.L.P.

(57) ABSTRACT

An embodiment of the present invention discloses a method for distributing a service according to a terminal type, wherein a correspondence relation table for storing correspondence relations between a terminal type and an IP address of a network administration server, and an IP address of a service server is preset in a DHCP (Dynamic Host Configuration Protocol) server, and the method comprises the steps of: a terminal initiating, a DHCP access request to a network with terminal type information included in the access request; the DHCP server issuing an assigned IP address to the terminal, and querying for and issuing an IP address of a network administration server and an IP address of a service server corresponding to the terminal type information; the terminal registering with the network administration server according to the obtained IP address of the network administration server, and obtaining an access to the network; the terminal initiating a service request to the service server according to the obtained IP address of the service server, and the service server distributing the service.

9 Claims, 2 Drawing Sheets

U.S. PATENT DOCUMENTS

| | | |
|---|---|---|
| 2002/0161868 A1 | 10/2002 | Paul et al. |
| 2003/0101217 A1 | 5/2003 | Aiyoshi et al. ............... 709/203 |
| 2004/0176971 A1 | 9/2004 | Machida et al. ................. 705/1 |
| 2005/0033853 A1* | 2/2005 | Jones et al. ................... 709/230 |
| 2005/0068969 A1 | 3/2005 | Park et al. ..................... 370/400 |
| 2005/0102400 A1* | 5/2005 | Nakahara et al. ............. 709/225 |

* cited by examiner

METHOD FOR DISTRIBUTING SERVICE ACCORDING TO TERMINAL TYPE

FIELD OF THE INVENTION

The present invention relates to the Internet, and particularly to a method for distributing a service according to a terminal type.

BACKGROUND OF THE INVENTION

With the development of networks, functions of terminals become more diversified, such as terminals on which various types of services of voice, data, video, etc. may occur simultaneously in a home network. Therefore, it is required in the network that a BRAS (Broadband Remote Access Server) distribute, according to different types of terminals, access requests of the terminals to different DHCP (Dynamic Host Configuration Protocol) servers in order to obtain both IP (Internet Protocol) addresses thereof and those of a terminal network administration server and of a service server, and thus service applications can be available at different ASPs (Application Service Providers). Moreover, the different services requested by the different types of terminals need to be carried on the same network.

FIG. 1 is a schematic diagram for different types of service terminals with their accesses to a network. Here, the terminals provided with different functions, such as an STB (Set Top Box) 111, an IAD (Integrated Access Device) 112 and a PC (Personal Computer) 113, have accesses to the network via a network access node 121, a BRAS 122 and a DHCP server 160. The network can be functionally divided into an access network 120 and a core network 130, which cooperate to serve a subscriber for an access and to achieve service functions. After a terminal has an access to the network, a network administration server 140 performs uniform management and control, and service servers 150 of respective APs distribute services.

In the prior art, for the terminals provided with different service functions (i.e. of different types), the access node in the network is required to enable the different types of terminals to be attached with different VLAN/PVC (Virtual Local Area Network/Permanent Virtual Circuit) identifiers, and thus, the BRAS distributes the services to different DHCP servers for processing according to the VLAN identifiers. A simplified flow chart is shown in FIG. 2 as following.

The terminal initiates a request for an access to the network so as to request for an IP address and other access information.

The access node assigns a VLAN/PVC identifier to the access terminal, and forwards the access request to the BRAS. If numerous terminals have accesses to the network at the same time, then VLAN/PVC identifiers different from each other can be assigned to each terminal.

The BRAS forwards the access request to a corresponding DHCP server according to the VLAN identifier included in the access request.

The DHCP server distributes network configuration parameters (including an IP address, a mask code, a domain name server, a domain name, route information, etc.) to the terminal.

The terminal receives the network configuration parameters distributed from the DHCP server, and after the user inputs the IP address of the network administration server and the IP address of the service server (which can be either provided to the user by an operator or configured manually in the terminal by the operator), initiates a service request to the service server of the ASP.

The service server of the ASP responds to the service request of the terminal by distributing the service.

SUMMARY OF THE INVENTION

Embodiments of the present invention provide methods for distributing a service according to a terminal type in view of the limitation of capabilities of an access node in the existing network in the case of a service request from a terminal.

An embodiment of the present invention provides a method applied in the Internet for distributing a service according to a terminal type, wherein correspondence relations between a terminal type and an IP address of a network administration server, and an IP address of a service server are preset in a DHCP (Dynamic Host Configuration Protocol) server, and when a terminal initiates a DHCP access request to a network, the method includes the steps of:

initiating, by an terminal, a DHCP access request to a network with terminal type information included in the access request;

issuing, by the DHCP server, an assigned IP address to the terminal, and issuing an IP address of a network administration server and an IP address of a service server corresponding to the terminal type information;

registering, by the terminal, with the network administration server according to the obtained IP address of the network administration server, and obtaining an access to the network;

initiating, by the terminal, a service request to the service server according to the obtained IP address of the service server, and distributing, by the service server, the service.

DETAILED DESCRIPTION OF THE EMBODIMENTS

A method according to an embodiment of the present invention includes: a terminal initiates a request, which includes terminal type information, for a DHCP access to a network; a DHCP server issues to the terminal an IP address of a corresponding network administration server and an IP address of a corresponding service server according to the terminal type; the terminal registers with the network administration server and gets an access to the network; and the terminal initiates a service request to the service server, and the service server distributes the service.

The differences between the method according to the embodiment of the present invention and the prior art are that the terminal upon being powered on automatically initiates an access request and reports its own terminal type, such as STB, IAD, RG (Residential Gateway) of User, RTU (Remote Terminal Unit), PC or other personal NGN (Next Generation Network) terminal. Particularly, the terminal identifies its own terminal type in an OPTION field of the DHCP access request message, and the network side parses the field to obtain the terminal type information. Moreover, the network side issues to the terminal the IP address of the corresponding network administration server and the IP address of the corresponding service server according to preset correspondence relations between a terminal type and an IP address of a network administration server, and an IP address of a service server.

Figure 1:
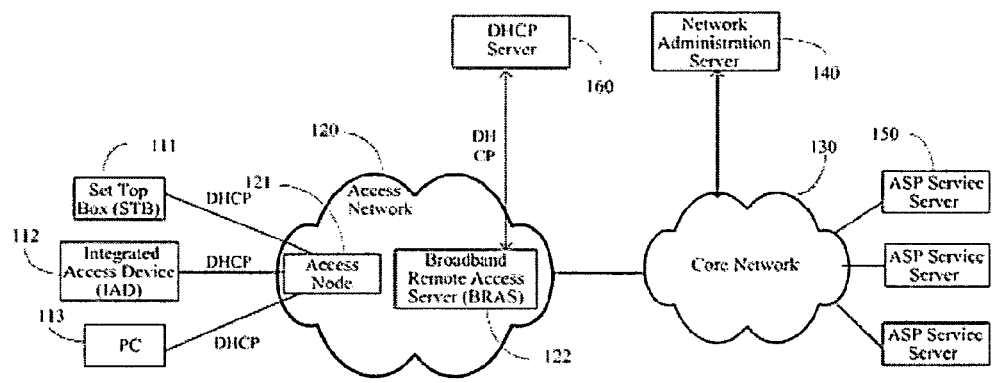
FIG. 1 is a schematic diagram for different types of service terminals with their access to a network.
Figure 2:
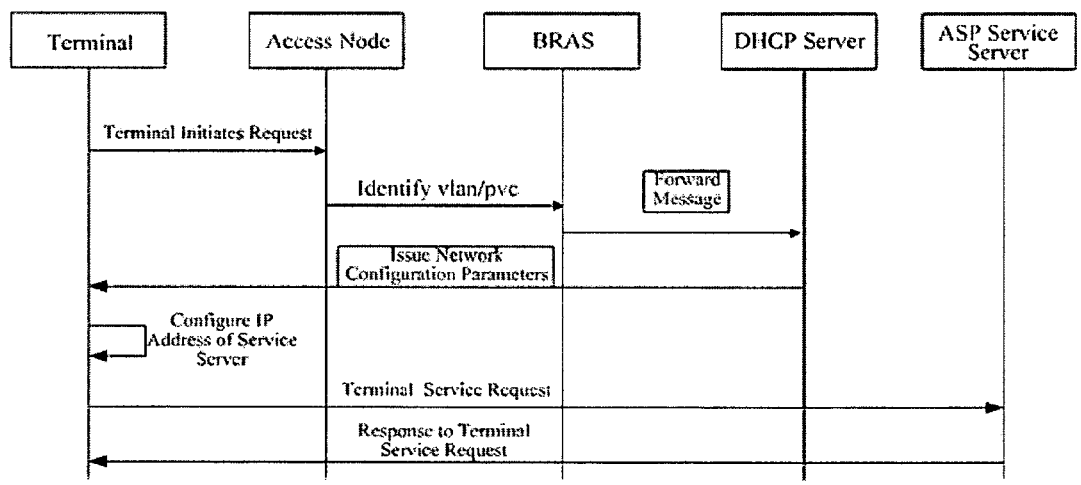
FIG. 2 is a flow chart for initiating a service request by a terminal in the prior art.
Figure 3:
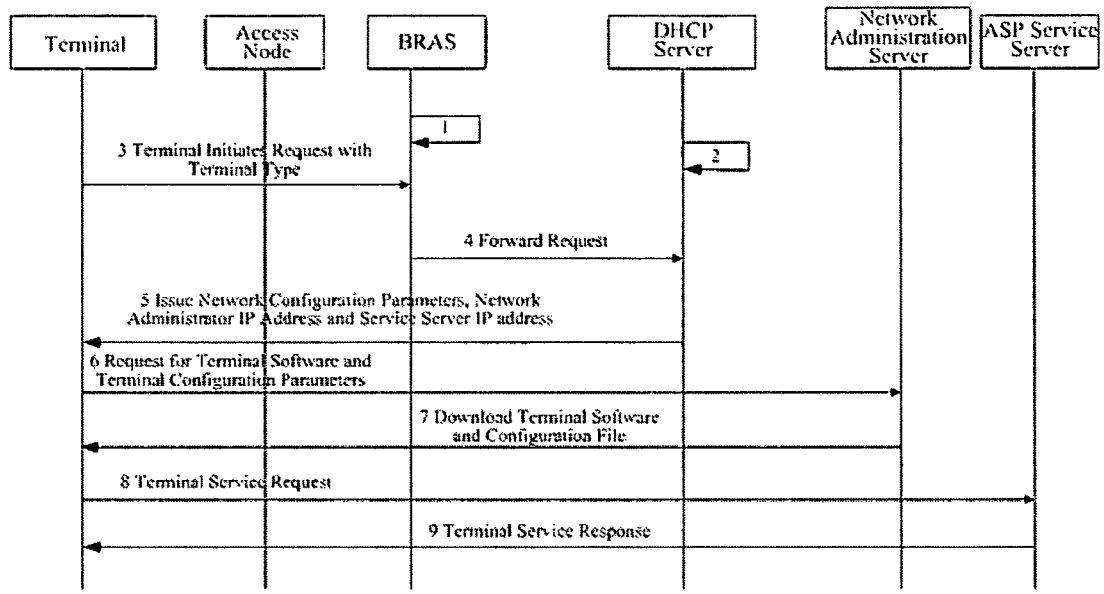
FIG. 3 is a flow chart for initiating a service request by a terminal according to an embodiment of the present invention.

With reference to FIG. 3, a procedure for the method according to the embodiment of the present invention is described in detail as follows.

A BRAS initially configures a mapping relation table of a terminal type and a service type, a terminal type and a DHCP server, and a service type and a network segment. Here, the service type may be a data service, a voice service, a video service or another value added service derived therefrom, and the network segment corresponds to the IP address of an ingress port of the BRAS (each ingress port of the BRAS is assigned with a fixed IP address). With the development of the network, if a new service type is added in the network, only the initial configuration needs to be modified so as to implement a service extension.

The correspondence relation table of a terminal type and an IP address of a terminal network administration server, and a terminal type and an IP address of a service server needs to be configured in the DHCP server. If a new terminal type is added in the network, only mapping relations between the new terminal type and an IP address of a corresponding network administration server, and an IP address of a corresponding service server need to be added in the DHCP server.

Figure 4:
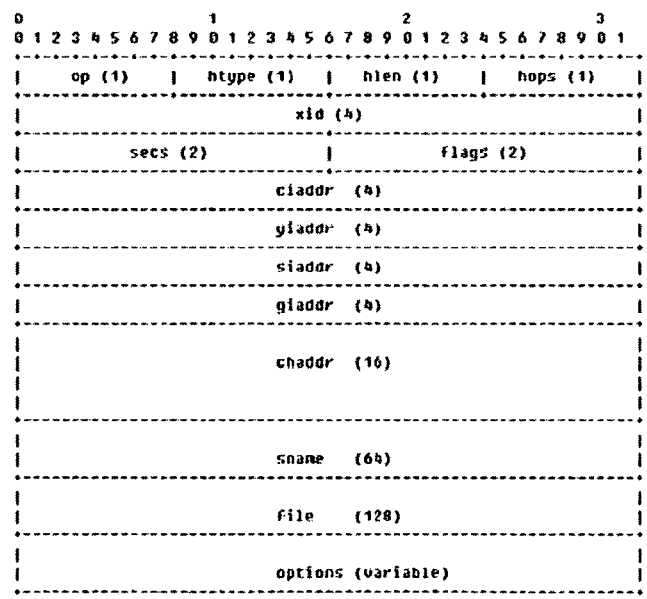
FIG. 4 is a schematic diagram for a format of a DHCP message.

The terminal upon being powered on automatically initiates a DHCP request, and includes terminal type information in an OPTION field of a DHCP request message. A format of the DHCP request message is shown in FIG. 4. Here, the OPTIONS is an extensible field. The format of the DHCP request message keeps unchanged in the embodiment of the present invention, and the terminal type information is identified simply through the extensible field OPTIONS. Therefore, descriptions of particular meanings of other fields are omitted herein. The terminal type information can include a manufacturer ID, a terminal type and a terminal model number, and its specific format is defined as follows: Manufacturer ID: Terminal Type: Terminal Model Number, such as xxx:STB:STB888, where xxx represents the manufacturer ID, and the number of bytes thereof is variable, at most 32 bytes; the STB indicates that the terminal type is a set top box, and the number of bytes thereof is variable, at most 32 bytes; and the STB888 represents the terminal model number, and the number of bytes thereof is variable length, at most 62 bytes. By way of an example, huawei:STB:STB628, the corresponding lengths of the manufacturer ID, the terminal type and the terminal model number are 6 bytes, 3 bytes and 6 bytes. The terminal type information can be identified through the OPTION60 in the OPTIONS field. Note that in the method according to the embodiment of the present invention, the network access node makes no modification to the DHCP access request initiated from the terminal, and merely transmits transparently the request to BRAS, that is, the embodiment of the present invention has no requirement for an existing network access node.

Upon receiving the DHCP request, the BRAS parses the OPTION field in the DHCP request message to obtain the terminal type information of the terminal, then forwards the DHCP request to a corresponding DHCP server according to the preset correspondence relation table of a terminal type and a DHCP server. Here, the BRAS identifies, in the giaddr field of the forwarded DHCP message, IP address information on an ingress port receiving this DHCP request.

Upon receiving the DHCP request, the DHCP server searches in the configured correspondence relation table of a terminal type and an IP address of a terminal network administration server, and a terminal type and an IP address of a service server according to the terminal type information included in the OPTION field, locates a IP address of a network administration server and an IP address of a service server corresponding to this terminal, and determines an IP address pool configured by the DHCP server according to the network segment corresponding to the IP address information in the giaddr field. Furthermore, the DHCP server selects an idle IP address in the determined IP address pool as an IP address to be assigned to the terminal, and obtains other network configuration parameters in the IP address pool, including a mask code, a domain name server, a domain name, route information, etc. The DHCP server issues the IP address to the terminal by means of the yiaddr field in a DHCP response message, and by means of OPTIONS field, issues the IP address of the network administration server and the IP address of the service server both of which are assigned to the terminal. Moreover, the DHCP server issues the corresponding network configuration parameters including a mask code, a domain name server, a domain name, route information, etc. according to the request from the terminal. For example, the mask code is returned through the OPTION1, the route information is returned through the OPTION3, the domain name server is returned through the OPTION6, the domain name is returned through the OPTION15, the IP address of the network administration server is returned through the OPTION43, the IP address of the service server is returned through the OPTION120.

Upon receiving the DHCP server response message, the terminal parses the related fields to obtain the IP address assigned to the terminal, the IP address of corresponding network administration server, the IP address of the corresponding service server, and the requested network configuration parameters. The terminal registers with the network administration server according to the obtained IP address of network administration server, and requests for obtaining terminal software (i.e. an application(s) running in an embedded operating system of the terminal) and terminal configuration parameters. Here, the terminal configuration parameters include terminal-related configuration parameters, such as, the terminal identifier, a port(s) used by the terminal, etc., and some configuration parameters of a service, such as, a user name and a password for an access to the service server, a visited port number, a service identifier, etc. The configuration parameters vary from one terminal service to another.

The network administration server issues the terminal software and the terminal configuration parameters to the terminal.

The terminal requests a service from the service server according to the obtained IP address of the service server.

The service server responds to the service request from the terminal by issuing the service to the terminal.

In steps 6 and 7 of the above procedure, the step of the terminal requesting for obtaining terminal software and terminal configuration parameters is optional since some service types may not required to be supported by special terminal software, or the service can be performed without related parameters to be provided by the terminal, and thus the corresponding step can be omitted. Instead, the terminal can initiate directly the service to the service server according to the obtained the IP address of the corresponding service server.

The present invention has been described and illustrated by the embodiments of the present invention and the drawings, it shall be recognized by those skilled in the art that those embodiments and drawings are merely illustrative and not restrictive, that the present invention shall be not limited thereto, and that various modifications and variations can be made thereto in light of the descriptions and the drawings without departing from the sprit and scope of the present invention as defined by the accompanying claims.

What is claimed is:

1. A method applied in the Internet for distributing a service according to a terminal type, wherein correspondence relations between the terminal type, and an IP address of a network administration server, and an IP address of a service server are stored in a DHCP (Dynamic Host Configuration Protocol) server, the method comprising:

initiating, by the terminal, a DHCP access request to a BRAS (Broadband Remote Access Server), wherein terminal type information is included in the DHCP access request;

upon receiving the DHCP access request from the terminal, querying, by the BRAS, for the DHCP server corresponding to the terminal type information;

forwarding, by the BRAS, the DHCP access request to the corresponding DHCP server, wherein a correspondence relation between the terminal type and the DHCP server is stored in the BRAS;

issuing, by the DHCP server, an assigned IP address to the terminal, and querying for and issuing an IP address of the network administration server and an IP address of the service server corresponding to the terminal type information;

registering, by the terminal, with the network administration server according to the obtained IP address of the network administration server, and obtaining an access to the network;

initiating, by the terminal, a service request to the service server according to the obtained IP address of the service server; and distributing, by the service server, the service;

wherein the network administration server is independent of the service server, and the IP address of the network administration server is different from the IP address of the service server.

2. The method according to claim 1, wherein in the step of initiating a DHCP access request, the terminal type information is included in an optional OPTION field of the message for the DHCP access request.

3. The method according to claim 1, wherein the terminal type information comprises a manufacturer ID, a terminal type and a terminal model number.

4. The method according to claim 2, wherein the terminal type information comprises a manufacturer ID, a terminal type and a terminal model number.

5. The method according to claim 3, wherein the format of the terminal type information is manufacturer ID: terminal type: terminal model number.

6. The method according to claim 1, wherein the step of issuing further comprises: issuing to the terminal a DHCP response message an OPTION field of which comprises the IP address of the network administration server and the IP address of the service server.

7. The method according to claim 1, wherein the IP address assigned to the terminal in the step of issuing is an idle IP address in an IP address pool configured by the DHCP server, the IP address pool being determined by a network segment corresponding to the IP address of the ingress port of the BRAS.

8. The method according to claim 1, wherein, the step of issuing further comprises: issuing, by the DHCP server, corresponding network configuration parameters through an OPTION field of an DHCP response message according to the request from the terminal.

9. The method according to claim 1, wherein the step of registering further comprises:

requesting, by the terminal, for obtaining terminal software and/or terminal configuration parameters from network administration server; and issuing, by the network administration server, the terminal software and/or the terminal configuration parameters to the terminal.

* * * * *